United States Patent [19]
Branicky et al.

[11] Patent Number: 6,029,097
[45] Date of Patent: Feb. 22, 2000

[54] PROCESS AND SYSTEM FOR TIME CONTROL OF A BASIC INDUSTRY PLANT

[75] Inventors: Michael Branicky, Cambridge, Mass.; Hans-Peter Buervenich, Erlangen, Germany; Ferd Hergert-Mueckusch, Egmating, Germany; Andreas Schief; Ewald Schoemig, both of Munich, Germany; Gerhard Dachtler, Baiersdorf, Germany

[73] Assignee: Siemens AG, Munich, Germany

[21] Appl. No.: 08/801,503

[22] Filed: Jan. 30, 1997

[30] Foreign Application Priority Data

Feb. 2, 1996 [DE] Germany .............................. 196 03 816
Jun. 13, 1996 [DE] Germany .............................. 196 23 671

[51] Int. Cl.[7] .................................................... G06F 19/00
[52] U.S. Cl. ........................ 700/146; 700/147; 164/449.1
[58] Field of Search ........................ 705/8, 9; 164/449.1, 164/4.1, 451; 700/145, 146, 147, 99, 104

[56] References Cited

U.S. PATENT DOCUMENTS

| | | | |
|---|---|---|---|
| 4,558,421 | 12/1985 | Shriver | 364/468.19 |
| 5,016,188 | 5/1991 | Lan | 364/172 X |
| 5,229,948 | 7/1993 | Wei et al. | 364/468.05 |
| 5,612,886 | 3/1997 | Weng | 364/468.08 X |
| 5,764,543 | 6/1998 | Kennedy | 364/468.05 X |

*Primary Examiner*—Paul P. Gordon
*Attorney, Agent, or Firm*—Kenyon & Kenyon

[57] ABSTRACT

A process and a device for comprehensive control of a basic industry plant, such as a steel plant or an integrated iron works, which includes subprocesses that are critical with regard to continuous material flow, e.g., casting processes. The invention optimizes the material flow through the system and prevents the interruption of the material flow prior to the start of subprocesses that are critical with regard to continuous material flow. The process sequence in a subprocess is subdivided into four steps, referred to as quarter cells with each quarter cell containing a point in time, a time range to describe possible process time fluctuations, the name of the previous quarter cell, i.e., the name of the previous substep of a subprocess, as well as a marker of whether the process time fluctuation of this subcell is influenceable or non-influenceable.

10 Claims, 2 Drawing Sheets

PROCESS AND SYSTEM FOR TIME CONTROL OF A BASIC INDUSTRY PLANT

BACKGROUND OF THE INVENTION

1. Field of the Invention

The present invention concerns a process and a system for time control of a basic industry plant, such as a steel plant or an iron works.

2. Description of the Prior Art

In plants of a basic industry, such as steel plants or iron works, processes or subprocesses in which continuous flow of material is critical often occur. If the material flow is interrupted before these critical processes or subprocesses, there can result additional costs or quality problems in the material being processed. A typical example of such a critical subprocess is the casting of liquid metal, in particular steel, in a steel plant. In a steel plant it is desirable that the material supply not be interrupted during the casting process.

SUMMARY OF THE INVENTION

The object of the present invention is to provide a process, and a system for performing a process, that allows continuous material flow to be maintained, in a basic industry plant, during subprocesses where continuous material flow is critical.

The object of the present invention is achieved through a process, and a system for conducting the process—in a basic industry plant (e.g., a steel plant or an integrated iron works) which includes subprocesses that are critical with regard to continuous material flow (e.g., casting processes, in particular steel casting processes)—where the material flow through the plant has a closed loop control so that stoppages or interruptions are avoided upstream from any subprocess where continuous material flow is critical. In this manner, it is possible to improve the quality of the material to be processed and avoid problems with production volume caused by material flow stoppages or interruptions.

In an advantageous embodiment of the present invention, the material flow $f_j^i$ of any subprocess j of a process i is controlled as a function of all overall processing times $v_j^i$ in the subprocesses, the buffer times between the subprocesses $u_j^i$, and the transportation times $S_j^i$ between subprocesses. The overall processing time of a subprocess is subdivided into the nominal processing time $r_j^i$, the adjustable processing time variation $p_j^i$, and the non-influenceable time deviation $d_j^i$. The nominal processing time $r_j^i$ is the time provided for a subprocess j. This can be, for example, the nominal time for melting steel. Random deviations or non-influenceable systematic deviations from the nominal processing times are modeled using the non-influenceable processing time deviations $d_j^i$ as disturbance parameters. The adjustable processing time variation $p_j^i$ provides a time period by which the overall processing time can be extended or shortened depending on whether the overall system requires more or less time for the subprocess j. In this manner, times or time periods can be modeled in a process in the same way as other process status parameters, such as temperature, with controlled variables and disturbances. This modeling allows approaches for controller design, such as are known for process status parameters such as temperature, to be transferred to time parameters.

In another advantageous embodiment of the invention, setup, adjustment, repair, or necessary waiting times in the processing pauses are interpreted as processing times and modeled accordingly. The model structure is considerably simplified by this modeling.

BRIEF DESCRIPTION OF THE DRAWINGS

Further advantages and inventive details of the present invention are described in the following description, drawings and claims. In particular, in the drawings:

DETAILED DESCRIPTION OF THE INVENTION

Figure 1:
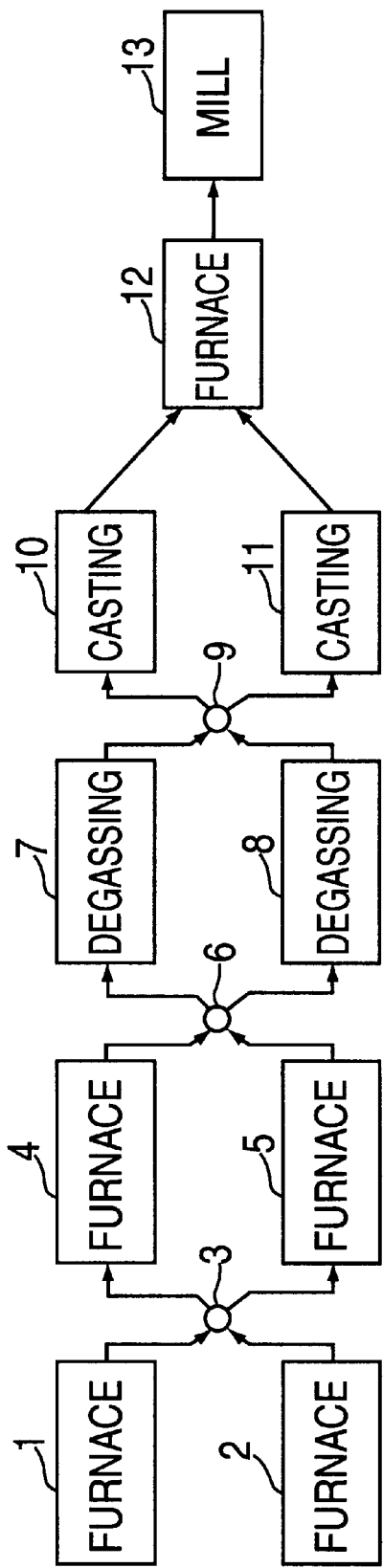
FIG. 1 shows a schematic diagram of an integrated steel plant or iron works without recycling.

FIG. 1 shows a schematic diagram of a plant of a basic industry for producing rolled metal, e.g., steel or iron. The plant has two electrical arc furnaces 1 and 2, which melt a supply of scrap iron, two ladle furnaces 4 and 5 for further chemical treatment of the metal melted in electric furnaces 1 or 2, two optional vacuum degassing stations 7 and 8 for further processing of the metal treated in ladle furnaces 4 or 5, two continuous casting systems 10 and 11, a soaking furnace 12, and a rolling mill 13.

The main purpose of a control system of the present invention is to control the progress of melts in the process of FIG. 1 so that a continuous casting process can be ensured in continuous casting systems 10 and 11 within a melting sequence. In the selected exemplary embodiment of the plant, the two processing lines, each including an electrical arc furnace 1 or 2, a ladle furnace 4 or 5, an optional vacuum degassing station 7 or 8, and a casting system 10 or 11 do not form separate processing units. As indicated by transfer elements 3, 6, and 9, the material being processed can be moved from one processing line to the other.

Figure 2:
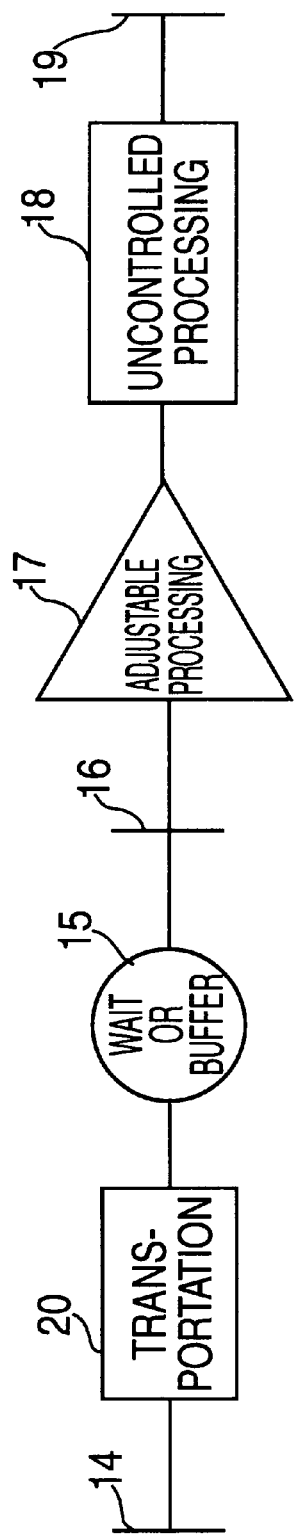
FIG. 2 shows a generic process model for a subprocess of FIG. 1.

FIG. 2 shows a generic process model for a subprocess in a plant. The beginning of processing $B_j^i$ of the jth subprocess in the ith process run is denoted by the reference number 16. The end of processing $E_j^i$ of the jth subprocess in the ith process run is denoted by reference number 19. The end of processing $E_{j-1}^i$ of the (j-1)th subprocess in the ith process run is denoted by reference number 14. The optionally adjustable waiting or buffer time $u_j^i$ of the jth subprocess in the ith process run is denoted by reference number 15. The adjustable processing time variation $p_j^i$ of the jth subprocess in the ith process run is denoted by reference number 17. The transportation time $s_j^i$ for moving the material from a directly upstream unit for performing the (j-1)th subprocess to the unit for performing the jth subprocess is denoted by reference number 20. The uncontrolled processing time of the material is denoted by reference number 18. The uncontrolled processing time of the material is divided into a nominal processing time $r_j^i$ and a deviation from the actual processing time $d_j^i$. The overall processing time of the material is the sum of the times referenced by reference numbers 17 and 18.

Figure 3:
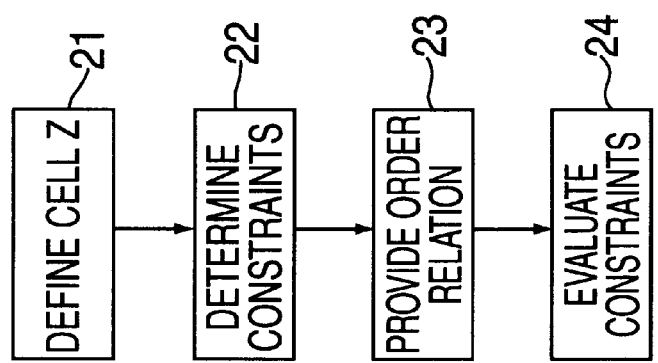
FIG. 3 shows the schematic flow chart of a control algorithm of the present invention.

FIG. 3 shows the schematic diagram of a control algorithm to control a process based on the process modeling of FIG. 2. A steel plant is used as an example, in which melts of metal are processed in a sequence of processing units.

The controller is supplied with:

the most recent relevant process state;

the production plan;

the ranges within which any random parameter may vary;

the ranges within which the parameters to be controlled can be selected; and a target function.

This data is provided, preferably by the operator or by a higher-order controller, which process controller may be in the form of a processor or computer.

The process controller delivers a control signal, which guarantees the satisfaction of all the boundary conditions of the production plan, and selects the control optimizing the target function among the admissible controls satisfying all constraints.

The production plan is defined as the sequence and rough times for processes of a higher order, i.e., the overall process. The target function of the process controller contains optimization criteria such as minimization of power consumption or maximization of throughput. If the controller is incapable of finding admissible control parameters that guarantee the satisfaction of all constraints, it outputs diagnostic data showing why the required control is not possible.

In the first step 21 of the control process, a cell Z(a, b) is defined for each melting charge (b) within the projectable range of operation of the process and for each processing unit (a) traversed by that melting charge (b).

Each of these cells have assigned to them the status:

NEW, when the melting charge (b) has not yet arrived at processing unit (a);

ARRIVED, when the melting charge (b) has arrived at processing unit (a), but the start time of the process at processing unit (a) has not yet been fixed;

DECIDED when the melting charge (b) has arrived at processing unit (a), the start time of the process has been fixed, but the process has not yet begun;

STARTED when the process at processing unit (a) has started but is not yet completed; and COMPLETED when the process at processing unit (a) is completed.

Each cell Z(a, b) also includes quarter cells A(a, b), B(a, b), C(a, b), and E(a, b). Each of the quarter cells Q contains:

a specific point in time $t_Q$ relating to the process (which is either a fixed number or a variable);

a time range relating to the process $[n_Q, o_Q]$;

the name $Q_p$ of the previous quarter cell;

a marker, CONTROLLED or RANDOM.

The propagation of the control of the entire plant then results from the propagation equation:

$$t_Q = t_{Q_P} + \pi$$

where $\pi \in [n_Q, o_Q]$ and is arbitrary in the case of RANDOM and is selected by the controller in the case of CONTROLLED.

Specifically, A(a, b) contains:

the point in time $t_A$ of the arrival of the melting charge (b) to unit (a);

the range $[n_s, o_s]$ of the possible transportation times $s_{a,b}$ from the previous processing unit to this unit;

the name of the E quarter cell E(a-1, b) of the previous unit for this melting charge;

the RANDOM marker.

B(a, b) contains:

the point in time $t_B$ of the process start of the melting charge (b) at unit (a);

the range $[n_u, o_u]$ of the possible waiting or buffer times $u_{a, b}$ between arrival and process start;

the name of the A quarter cell A(a, b) of this melting charge (b) at this unit (a);

the CONTROLLED marker.

C(a, b) contains:

the point in time $t_c$ of the planned process end of melting charge (b) at unit (a);

the range $[n_r, o_r]$ of the possible process times $r_{a, b}$;

the name of the B quarter cell B(a, b) of this melting charge (b) at this unit (a);

the CONTROLLED marker.

E(a, b) contains:

the time $t_E$ of the actual process end;

the range $[n_d, o_d]$ of the possible process time fluctuations $d_{a, b}$;

the name of the C quarter cell C(a, b) of this melting charge (b) at this unit (a);

the RANDOM marker.

In a second step 22, the basic constraint system containing the boundary conditions of the system is determined. End time $E_{a, b1}$ of cell $Z(a, b_1)$, i.e., the time $t_E$ of quarter cell $E(a, b_1)$, for a charge ($b_1$) and beginning time $B_{a, b2}$ of cell $Z(a, b_2)$, i.e., the time $t_B$ of quarter cell $E(a, b_2)$, for a charge ($b_2$) following charge ($b_1$) are considered for each unit (a) and for each melting charge change from melting charge ($b_1$) to following melting charge ($b_2$). In each case:

$$E_{a, b1} \leq B_{a, b2}$$

must apply (possibly also $E_{a, b1} + \Delta T \leq B_{a, b2}$, if a minimum idle time $\Delta T$ for unit (a) is given). This boundary condition is based the fact that a melting charge ($b_n$) must leave a unit (a) before unit (a) can start processing the next melting charge ($b_{n+1}$).

However, if the unit is a continuous caster, a just-in-time condition results in the following additional inequality:

$$E_{a, b1} \geq B_{a, b2}$$

(or also $E_{a, b1} + \Delta T \geq B_{a, b2}$ if a maximum melting charge switch-over time $\Delta T$ is given). This boundary condition is based on the fact that the next melting charge ($b_{n+1}$) must start processing at unit (a) before or at the same time as the end of processing of melting charge ($b_n$) at unit (a). Together with the previously-defined constraint $E_{a, b1} \leq B_{a, b2}$ this implies that the end time of processing melting charge ($b_n$) is equal to the start time of processing melting charge ($b_{n+1}$) at unit (a). The set of all these inequalities for each subprocess constitutes the basic constraint system. In addition, other constraint inequalities can be defined by the user or controller (such as constraints for cooling times across units).

In the third step 23 of the control, the quarter cells Q within the plunger range are provided with an order relation wherein certain quarter cells Q are defined as less than or equal to other quarter cells Q, in the following way. A quarter cell $Q_1$ is to be defined as less than or equal to a quarter cell $Q_2$ with respect to this order relation ($Q_1 \leq Q_2$), if for all admissible developments of the controlled system that satisfy the given constraints, the point in time $t_{Q_1}$ of quarter cell $Q_1$ is known at the point in time $t_{Q2}$ for a quarter cell $Q_2$ marked RANDOM, or given a quarter cell $Q_2$ marked CONTROLLED. The point of time $t_{Q1}$ is known when the point in time $t_{Q2}$ has to be decided upon by the controller. The quarter cells are then arranged linearly in information order sequence $Q_1, Q_2, \ldots, Q_N$, numbered 1 through N so that if a quarter cell $Q_i$ is less than a quarter cell $Q_j$ with respect to the above order relation, then $Q_i$ comes before $Q_j$ in the information order sequence, i.e., i<j. In addition, it is ensured that those quarter cells Q that are labeled with the marker CONTROLLED and whose control is not influenced by any RANDOM quarter cells (except part cells for which the values $t_{Q1}$ are already known) receive the lowest sequential numbers. These are the quarter cells $Q_i$ for which the control value are determined next (numbers 1 through M). This means that the controllable quarter cells will precede the non-controllable quarter cells. The sequence of quarter cells A, B, C, E, within cell Z is preserved in the information sequence, but the quarter cells A, B, C, E, need not follow one another directly in the information sequence.

In a fourth step 24 the constraint system thus obtained is evaluated. If the quarter cells $Q_i$ are numbered from 1 through N as explained above, the basic constraint system $U_N$ formed by the set of all inequalities in the time variables times $t_{Q1}$ through $t_{QN}$. Constraint system $U_{N-1}$ is obtained from $U_N$ by elimination of time variable $t_{QN}$ and appropriate conversion of the reduced inequalities as described below. These two steps (elimination and conversion) are repeated N–M times until the constraint system $U_M$ is obtained, which only contains the time variables $t_{Q1}$ through $t_{QM}$ for which the control values are to be determined next.

For the elimination step from system $U_k$ to $U_{k-1}$ according to the above propagation equation, time $t_{Qk}$ is substituted by the time variable of the previous quarter cell $t_{Qkp}$, which has a smaller sequential number. This is done using two sets of substitution rules, one for the case of a RANDOM quarter cell, the other for the case of a CONTROLLED quarter cell. These substitution rules are based on mathematical theorems. By doing so, the constraint system is considerably expanded. In addition, new variables:

$$\overline{t_{0i}(Q_k)} \text{ and } \underline{t_{0i}(Q_k)}$$

appear, which express the maximum and minimum values, respectively, of a variable $t_{Qi}$ if all information available to quarter cell $Q_k$ is evaluated.

The constraint system is now converted into an equivalent, or at least sufficient, system, i.e., a system whose solution is a solution of the original system, and reduced (in particular by eliminating redundancies) in order to avoid an overexpansion of the system. If contradictions are found in the constraint system during conversion, the algorithm is terminated with the output of the contradiction and the diagnosis regarding which of the parameters involved are responsible for the non-controllability.

The set of allowed values for the controls $t_{Q1}$ through $t_{QM}$ is determined by solving the constraint system $U_M$. Then the control values that optimize the underlying target function are selected from this set. These control values are transmitted to the steel plant.

Thus, summarizing, the following steps are carried out:
1. Step 21: Definition of cells and quarter cells
2. Step 22: Establishing the inequalities of the basic constraint system
3. Step 23: Sorting the quarter cells of the basic constraint system
4. Step 24: Analyzing and solving the basic constraint system, and obtaining the target function.

Figure 4:
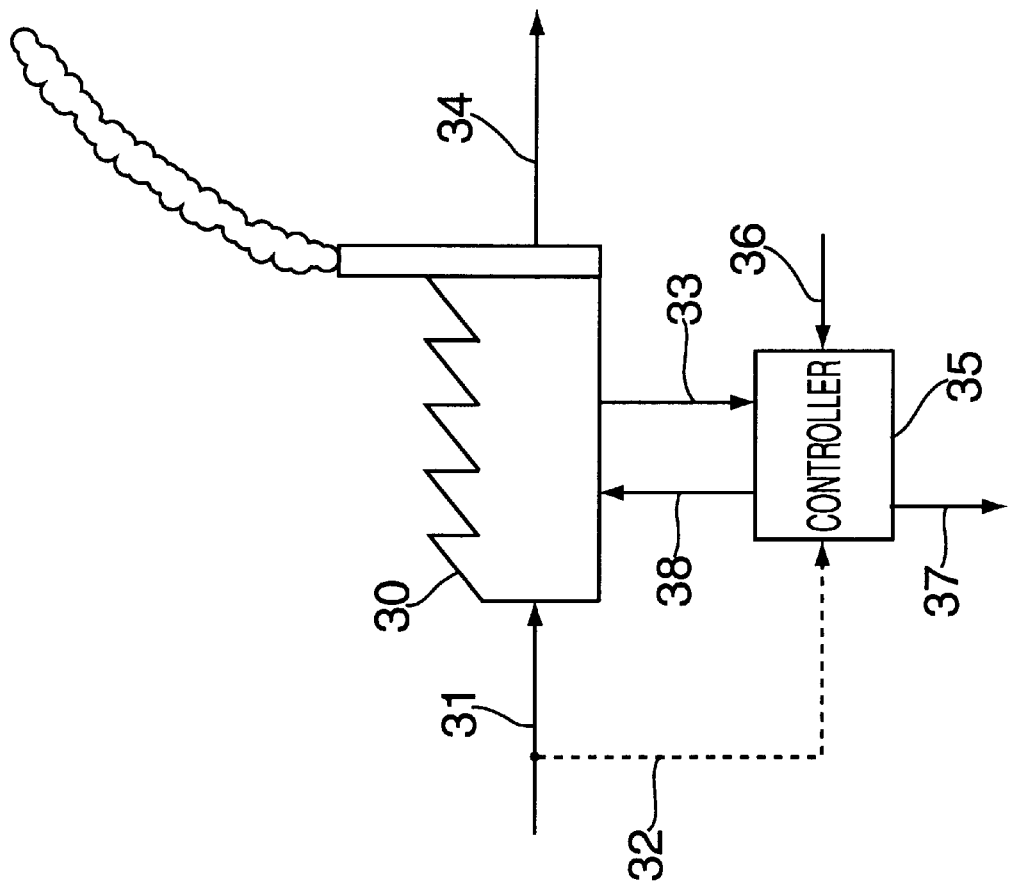
FIG. 4 is a schematic, showing how the process of the present invention is integrated in the control of a system of a basic industry.

FIG. 4 shows how the process according to the invention is integrated in the control of a system 30 of a basic industry. Input materials 31, for example raw materials to be processed in system 30, enter system 30 and exit as output materials 34. A controller 35 according to the invention, such as a processor or a computer, defines the influenceable process times of system 30. For this purpose, information 32 concerning material input, information 33 concerning the characteristics and current status of system 30—in particular, concerning the time characteristics of individual subprocesses according to FIG. 2—as well as higher-level target functions 36, according to which the basic system should operate, are supplied to controller 35 as inputs. This higher-level information 36 may contain, for example, the power consumption optimization requirements or the processing time optimization requirements of system 30 and may be input by an operator. The controller 35 transmits the computed control values 38 to the system 30. Furthermore, controller 35 according to the invention advantageously forwards information 37 to a higher-level management system (not shown), which may also be in the form of a processor or computer. This information can be, for example, diagnostic information, for example in the case where a solution for continuous material flow cannot be found.

While the invention has been described in the specification and illustrated in the drawings with reference to preferred embodiments, it will be understood by those skilled in the art that various changes may be made and equivalents may be substituted for elements of the invention without departing from the scope of the claims.

What is claimed is:

1. A method for controlling a process in a basic industry plant, the process having subprocesses that require continuous material flow, the method comprising:

moving material through the subprocesses in a material flow;

controlling the material flow in a closed loop so that interruption of the material flow prior to the beginning of a subprocess requiring continuous material flow is avoided, and further including controlling the material flow according to at least one of the following parameters:

processing times of the material in one of the subprocess;

buffer times during which the material is held prior to being processed in one of the subprocess; and transportation times of the material between subprocesses.

2. The method according to claim 1, further comprising:

forming a basic constraint system from a series of inequalities, successively solving the inequalities backwards so that allowable time ranges for influenceable times are calculated and selecting values within the allowable time ranges that optimize the overall process.

3. The method according to claim 1, further comprising:

modeling unit setup and repair times using a process model used for material processing.

4. The method according to claim 1, further comprising:

controlling the process according to:
processing times in all of the subprocesses;
buffer times in all of the subprocesses; and
transportation times between all of the subprocesses.

5. The method according to claim 1, further comprising:

subdividing the processing time of a subprocess into a nominal processing time, an adjustable processing time variation and a non-influenceable processing time deviation.

6. The method according to claim 5, further comprising:

controlling the material flow by controlling a subprocess according to at least one of the adjustable processing time variation and the buffer time.

7. The method according to claim 1, further comprising:

controlling the material flow using a controller, and controlling the process according to measured values of the actual process, a production plan, a target function, and assigned limits for processing times, buffer times, and transportation times.

8. The method according to claim 7, further comprising:

dividing each subprocess into four quarter cells, each quarter cell including a point in time, a time range to describe possible process time fluctuations, a name of a previous quarter cell, and a marker indicating whether process time fluctuations of the subcell are influenceable or non-influenceable.

9. The method according to claim 8, further comprising:

controlling each subprocess controlled such that an end of a previous subprocess may not occur after a start of a subsequent subprocess and the start of a subsequent process may not occur prior to the end of a previous process.

10. The method according to claim 8, further comprising:

sequencing the quarter cells according to boundary conditions including one of minimum and maximum process times and one of minimum and maximum waiting times when passing from one subprocess, and arranging influenceable quarter cells before non-influenceable quarter cells, and maintaining a sequence of the quarter cells without the quarter cells following one another directly.

* * * * *